E. C. BLACKSTONE & F. & E. CARTER.
APPARATUS FOR MIXING ATOMIZED FUEL WITH THE AIR IN INTERNAL COMBUSTION ENGINES.
APPLICATION FILED MAR. 16, 1915.

1,171,018.

Patented Feb. 8, 1916.
3 SHEETS—SHEET 1.

Witnesses

Inventors
E. C. Blackstone
F. Carter
E. Carter
By Henry T. Bright
Attorney

E. C. BLACKSTONE & F. & E. CARTER.
APPARATUS FOR MIXING ATOMIZED FUEL WITH THE AIR IN INTERNAL COMBUSTION ENGINES.
APPLICATION FILED MAR. 16, 1915.
1,171,018.
Patented Feb. 8, 1916.
3 SHEETS—SHEET 3.
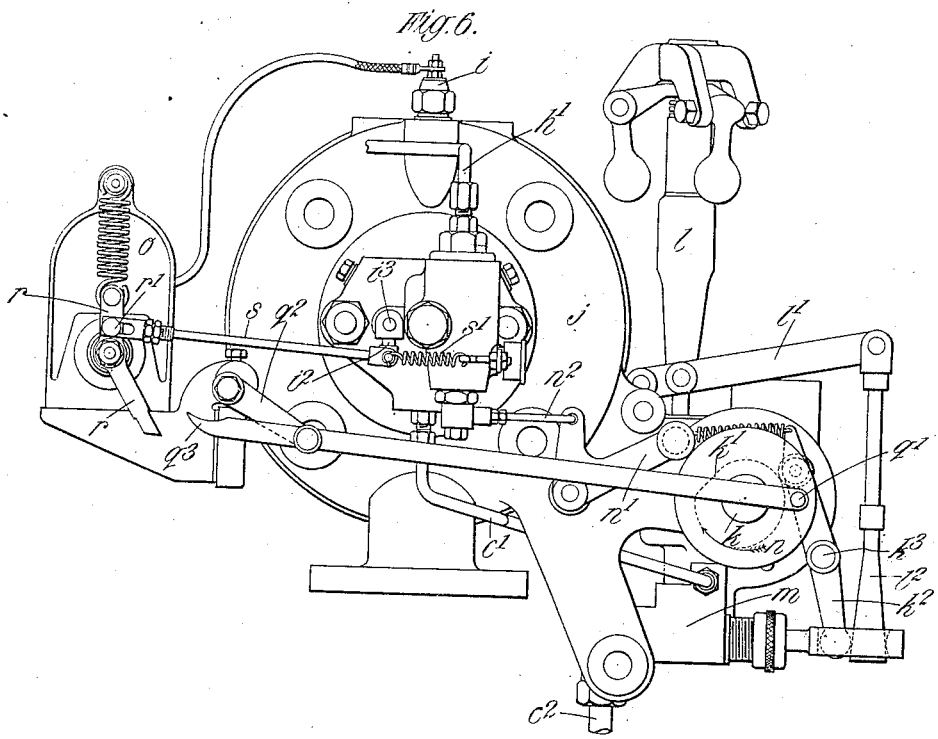
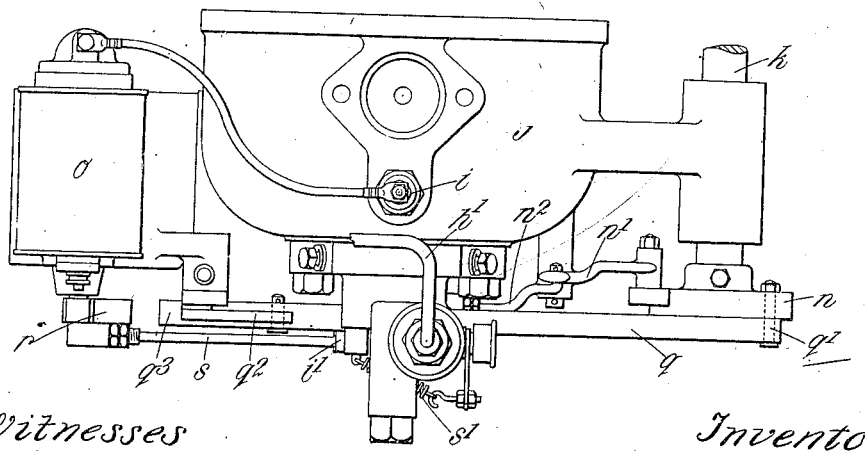
Witnesses
Inventors
E. C. Blackstone
F. Carter
E. Carter
By
Henry T. Bright
Attorney

UNITED STATES PATENT OFFICE.

EDWARD C. BLACKSTONE, FRANK CARTER, AND EVERSHED CARTER, OF STAMFORD, ENGLAND.

APPARATUS FOR MIXING ATOMIZED FUEL WITH THE AIR IN INTERNAL-COMBUSTION ENGINES.

1,171,018.      Specification of Letters Patent.     Patented Feb. 8, 1916.

Application filed March 16, 1915. Serial No. 14,766.

*To all whom it may concern:*

Be it know that we, EDWARD CHRISTOPHER BLACKSTONE, FRANK CARTER, and EVERSHED CARTER, engineers and subjects of the King of Great Britain, residing at Rutland Engineering Works, Stamford, in the county of Lincoln, England, have invented new and useful Improvements in Apparatus for Mixing Atomized Fuel with the Air in Internal-Combustion Engines; and we do hereby declare the following to be a full, clear, and exact description of the invention, such as will enable others skilled in the art to which it appertains to make and use the same.

Our invention relates to fuel spraying apparatus for internal combustion engines, in which the fuel is sprayed by compressed air, and has for its object the provision of means for mixing the atomized fuel with the air in the combustion chamber.

According to our invention we arrange in front of the air jet a port or channel either in or leading into the combustion chamber and open to the combustion chamber at both ends, in such a manner that the rush of atomized fuel or air from the jet through this port or channel causes a circulation of the contents of the said chamber.

In one way of carrying out our invention we provide one or more ports, leading from any suitable part of the combustion chamber into the main port through which the injecting air is blown and arrange the outlet of these ports in such a relation to the air jet that the injection of the compressed air causes a stream of air to flow through the main port mixing on its way with the atomized fuel which may be introduced at any suitable point, either into a circulating port or into the main port or behind the air jet. Ignition may be effected by an electric sparking apparatus.

To enable our invention to be fully understood we will describe the same with reference to the accompanying drawings in which:—

Figure 1:
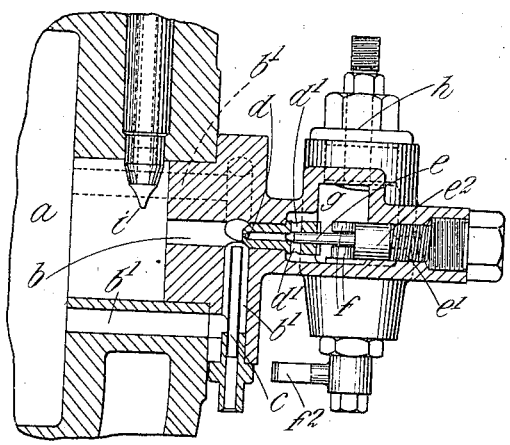
Figure 2:
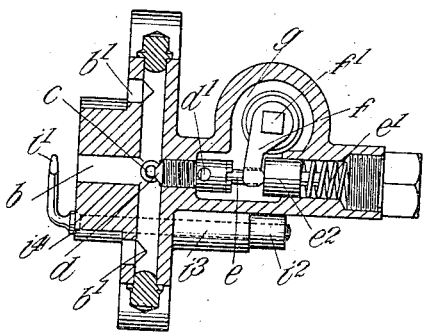
Figure 3:
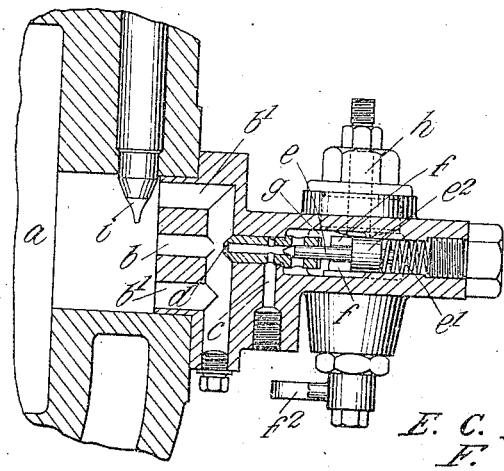
Figure 4:
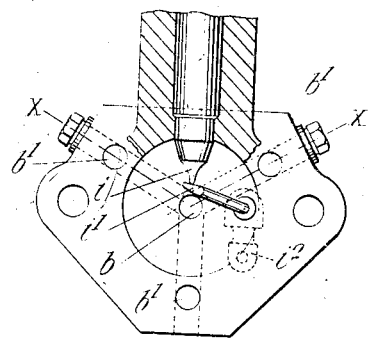
Figure 5:
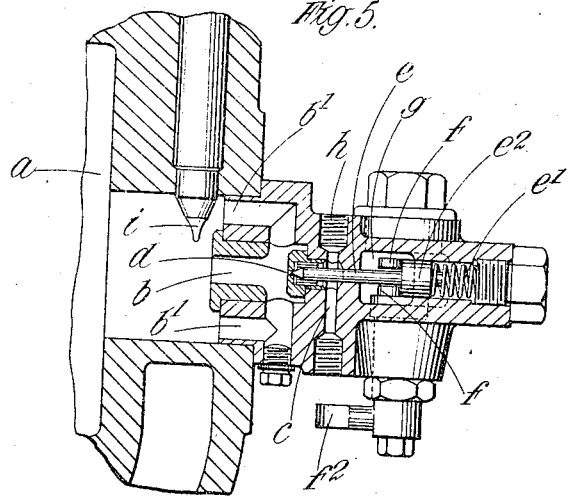

Figure 1 is a sectional elevation of our fuel and air mixing apparatus. Fig. 2 is a sectional plan of the same taken on line $x$—$x$ Fig. 4. Fig. 3 is a sectional elevation of a modification of our invention. Fig. 4 is an end elevation of the arrangement shown in Figs. 1 and 2. Fig. 5 is a sectional elevation of a further modification. Fig. 6 is an end elevation of the cylinder of an engine fitted with our apparatus. Fig. 7 is a plan of the same.

Referring now to Figs. 1 to 5, $a$ is the combustion chamber and $b$ a port leading into it, and open to the combustion chamber at its rear end through the air circulating ports $b'$, $b'$. $c$ is the fuel supply pipe and $d$ the air jet controlled by the valve $e$ which is pressed on to its seat by the spring $e'$ and actuated by the lever $f$ the free end of which engages the collar $e^2$ on the valve $e$. $g$ is a chamber to which compressed air is supplied by means of the duct $h$, the air being lead to the valve seat through the ports $d'$, $d'$. The lever $f$ is operated in any suitable way from the outside of the chamber $g$, through the spindle $f'$ and lever $f^2$, the bearing being made air-tight. $i$ is the insulated electrode of an electrical ignition device and $i'$ is the circuit breaking arm actuated by the lever $i^2$ and spindle $i^3$. In Figs. 1 and 2, the fuel is introduced through one of the circulating ports and delivers into the main port in front of the air jet $d$. In Fig. 3 the fuel is delivered into the port between the air valve $e$ and the jet $d$ and two air circulating ports $b'$, $b'$ are arranged closer in to the central port $b$ which is optional. In Fig. 5 the fuel is introduced behind the valve seating.

Referring now to Figs. 6 and 7, $j$ is the outside of the combustion chamber and $k$ the cam shaft driven from the crank shaft in the usual manner. $m$ is the fuel pump operated by the cam $k'$ through the lever $k^2$ pivoted at $k^3$. $l$ is the governor controlling the suction stroke of the pump by means of the lever $l'$ and wedge $l^2$. The lever $f^2$ controlling the fuel spraying valve $e$, is actuated by the cam $n$, through the lever $n'$ and connecting rod $n^2$. $o$ is a magneto, the armature of which is oscillated by the connecting rod $q$ on the crank pin $q'$. The free end of the rod $q$ is carried by the link $q^2$, the tappet $q^3$ operating and tripping the armature lever $r$. The rod $s$ is pulled against the spring $s'$ by the pin $r'$ on the lever $r$ after the lever $r$ is tripped by the tappet $q^3$. The inner end of the rod $s$ is connected to the lever $i^2$ which actuates the circuit breaking arm $i$. To avoid complicating the drawing the governor gear and fuel pump are omitted in Fig. 7.

The operation of the apparatus is as follows:—Near the end of the compression stroke the fuel pump $m$ causes the fuel to rise in the duct $c$, and the cam $n'$ opens the valve $e$. The air blast issuing from the orifice $d$ will lift the fuel and eject it through the port $b$ breaking it up into a fine mist and at the same time causing a sharp draft of air from the combustion chamber to flow through the ports $b'$, thus more perfectly mixing the atomized fuel with the air in the combustion chamber. At the correct time the tappet $q^3$ releases the lever $r$, giving the ignition spark at a point $i$, Fig. 4 in the path of a portion of the sprayed fuel.

What we do claim as our invention and desire to secure by Letters Patent is:—

1. In an internal combustion engine, the combination with the combustion chamber, of a compressed air reservoir having a passage communicating with the chamber, a nozzle in said passage, a valve controlling said nozzle, means for delivering fuel to the passage whereby a mixture of air and fuel is delivered to the combustion chamber, and means for circulating the mixture delivered to the combustion chamber back in the direction of the reservoir and then redelivering same to the passage in advance of the nozzle.

2. In an internal combustion engine, the combination with the combustion chamber including a compressed air reservoir in its wall and having a passage in its wall connecting the chamber with the reservoir, the wall of said chamber further having a circulated passage communicating at one end with the chamber and at its other end with the first named passage, a nozzle in the first named passage outwardly of its connection with the second named passage, a valve controlling said nozzle, and means for delivering fuel to the first named passage.

In testimony whereof we have signed our names to this specification in the presence of two witnesses.

EDWD. C. BLACKSTONE.
FRANK CARTER.
EVERSHED CARTER.

Witnesses:
ERNEST EDW. BLACKSTONE,
RICHARD E. WATTS.